Figure 1:
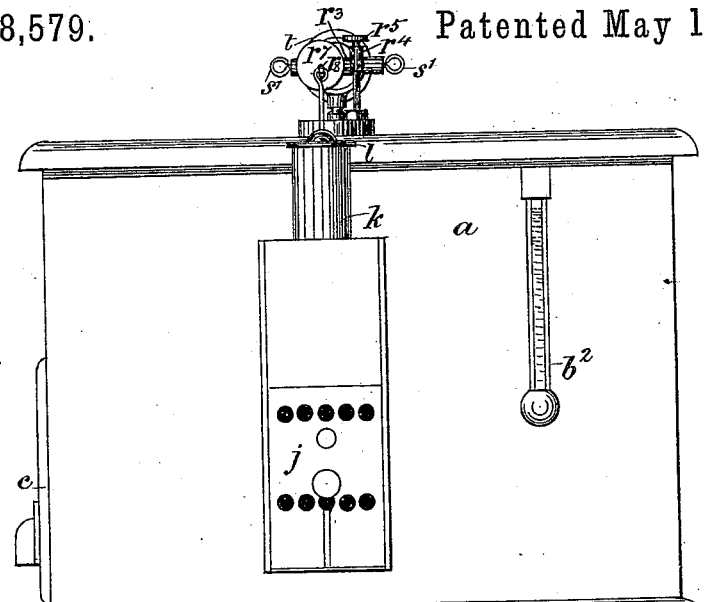

(No Model.) 2 Sheets—Sheet 1.

C. E. HEARSON.
APPARATUS FOR HATCHING EGGS BY ARTIFICIAL HEAT.

No. 298,579. Patented May 13, 1884.

Witnesses

Inventor
Charles Edward Hearson (No Model.) 2 Sheets—Sheet 2.
C. E. HEARSON.
APPARATUS FOR HATCHING EGGS BY ARTIFICIAL HEAT.
No. 298,579. Patented May 13, 1884.
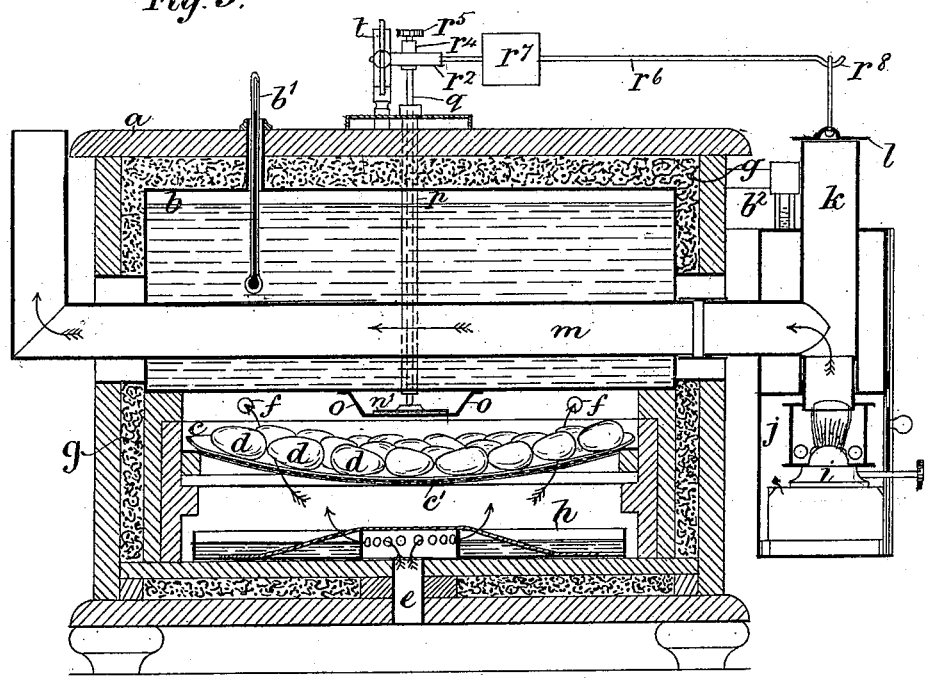
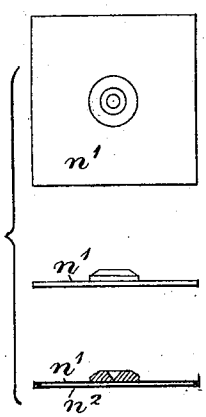
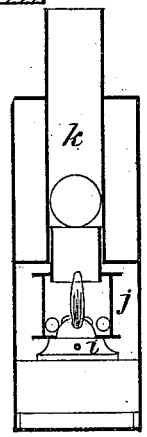
Witnesses Charles Edward Hearson, Inventor

UNITED STATES PATENT OFFICE.

CHARLES E. HEARSON, OF 115 SOUTHWARK STREET, COUNTY OF SURREY, ENGLAND.

APPARATUS FOR HATCHING EGGS BY ARTIFICIAL HEAT.

SPECIFICATION forming part of Letters Patent No. 298,579, dated May 13, 1884.

Application filed July 2, 1883. (No model.) Patented in England November 24, 1881, No. 5,141; in France March 8, 1882, No. 147,775 and in Belgium April 15, 1882, No. 57,516.

*To all whom it may concern:*

Be it known that I, CHARLES EDWARD HEARSON, a subject of the Queen of Great Britain, residing at No. 115 Southwark Street, in the county of Surrey, England, engineer, have invented certain new and useful Improvements in Apparatus for Hatching Eggs by Artificial Heat, which improvements are in part applicable to other purposes, (for which I have received Letters Patent in Great Britain, No. 5,141, dated November 24, 1881, and in France, No. 147,775, dated March 8, 1882, and in Belgium, No. 57,516, dated April 15, 1882,) of which the following is a specification.

My invention consists of the improvements hereinafter described, by which an equable or nearly equable temperature is automatically maintained within incubators or apparatus for hatching eggs by artificial heat.

An incubator as ordinarily constructed consists of a box or chest in the upper part of of which is a tank or vessel for containing hot water and in the lower part a drawer for containing the eggs to be hatched, the said eggs being hatched by the heat radiated from the under side of the hot-water tank. In use this apparatus is attended by the disadvantage that the water gradually loses its heat and requires to be removed and replaced by freshly-heated water from time to time, and the eggs are consequently subjected to injurious variations of temperature. According to my invention I heat the water in the tank by means of a gas-flame or other convenient and suitable source of artificial heat, and automatically regulate the amount of heat conveyed to the water by means of apparatus actuated by the vaporization and condensation of a liquid which boils at about the same temperature as that at which the eggs should be kept, the vaporization of the said liquid causing the heat to be diverted from the water-tank, and the condensation of the said liquid causing the heat to pass thereto.

In carrying out my invention I arrange a flue or tube in the water-tank, the ends of said flue or tube passing through and projecting from the sides of the chest or case of the incubator; and I arrange a lamp or gas-burner in connection with the said flue, so that the flame of the lamp or of a jet of gas issuing from the burner shall cause a current of heated air to pass through the flue, the water in the tank being thereby heated. In order to regulate the quantity of heated air passing through the said flue, I arrange beneath the water-tank a hermetically-sealed case of thin metal or other suitable material, the said case being filled with or containing a piece of absorbent fabric saturated with a liquid which boils at a temperature of about 103° Fahrenheit, and being so formed as to be capable of being expanded by pressure from within and of being caused to collapse by pressure from without; and I connect the said case by means of a rod and lever or other suitable mechanism with a valve or damper, by varying the position of which the passage of heated air through the flue may be regulated or entirely shut off or diverted.

Figure 2:
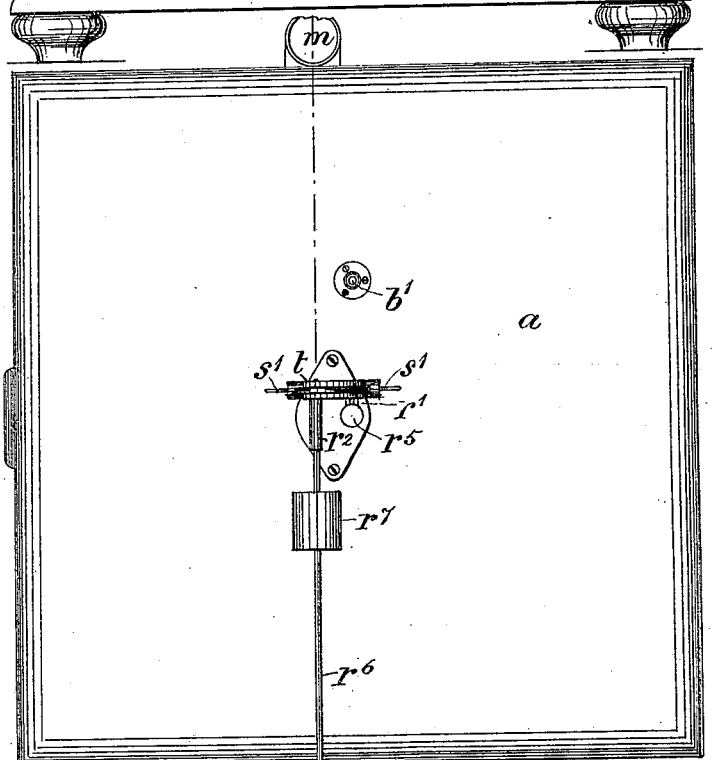

Figure 1 of the accompanying drawings is a side elevation, Fig. 2 is a plan, and Fig. 3 is a section taken on the line A, Fig. 2, of an incubator or apparatus for hatching eggs by artificial heat, to which my improvements are applied. Figs. 4, 4$^a$, and 5 are details of the said apparatus, hereinafter referred to.

The same letters and figures of reference indicate the same parts in the several figures of the drawings.

*a* is the case of the incubator.

*b* is the tank or water-vessel. *b'* is a thermometer by which the heat of the water in the said vessel may be ascertained, and $b^2$ is a gage-glass for showing the height of the water in the said vessel.

*c* is the drawer in which the eggs to be hatched are placed, the said eggs (marked *d* in Fig. 3 of the drawings) being supported by a perforated tray, *c'*, through the perforations in which air passes, the air entering the apparatus by the aperture *e*, and passing out by apertures in the front and back of the case, two of which apertures are shown in Fig. 3, and marked $ff$. The course of the air is indicated by arrows in Fig. 3.

$g$ is the usual packing, of sawdust or other imperfect conductor of heat; and $h$ is the water-tray for moistening the air as it enters the incubator.

$i$ is the lamp by which the water in the tank $b$ is heated. The said lamp is contained in a casing, $j$, and is provided with a chimney, $k$, furnished with a valve or damper, $l$.

$m$ is the flue passing through the water-tank or vessel $a$, one end of which flue is connected to the chimney $k$ of the lamp $i$, the other end being open to the atmosphere.

$n'$ is the hermetically-sealed metal case or capsule, supported by brackets $o\ o$ beneath the water-vessel $b$, which case or capsule is shown separately in plan, edge view, and section in Fig. 4, and in section on an enlarged scale in Fig. $4^a$; and it consists of two plates of metal, $n'\ n^2$, soldered together at their edges, and hermetically inclosing a piece of absorbent fabric, $n^3$—such as blotting-paper—saturated with gasoline or any liquid which boils at the temperature at which the interior of the apparatus is required to be kept.

The mechanism by which the expansion and contraction of the case or capsule $n'$ is caused to actuate the valve or damper $l$ consists of a rod, $q$, passing freely through a tube, $p$, secured near its upper and lower ends in the top and bottom, respectively, of the water-vessel $b$, which rod $q$ bears at its upper end against a screw, $r^5$, working in a socket, $r^4$, formed on a lever, $r'$, which lever is formed on an axis, $r^3$, which works on centers $s'\ s'$, carried by a standard, $t$, mounted on the top of the case $a$. The said axis $r^3$ has also formed on it another lever, $r^2$, to which is affixed a rod, $r^6$, which constitutes a prolongation of the said lever, and carries a sliding weight, $r^7$, and has formed at its free end a hook, $r^8$, to which the damper $l$ of the chimney $k$ is suspended. This arrangement acts as follows: The whole of the heat from the flame of the lamp $i$ passes through the tube or flue $m$ until the water in the vessel $b$ is sufficiently heated to raise the temperature of the interior of the apparatus to the degree at which the liquid in the case or capsule $n'$ boils. When the said liquid boils, it expands the capsule $n'$, and the rod $q$, resting on it, is consequently raised, and raises the levers $r'\ r^2$ and the damper $l$ of the chimney $k$, which chimney being now open, the current of heated air from the lamp passes through it to the atmosphere, instead of passing through the flue $m$, and continues to pass through the said chimney until the water has cooled sufficiently to allow the capsule $n'$ to collapse, when the rod $q$ and levers $r'\ r^2$ descend, and the chimney is closed and remains closed until the current of heated air from the lamp passing through the tube or flue $m$ has again raised the temperature of the water to the degree necessary to expand the capsule $n'$ and again divert the heat from the water-vessel $b$. A practically even temperature is thus automatically maintained within the incubator, the variation of temperature being but a fraction of a degree.

The method of using the apparatus hereinbefore described is as follows: The egg-drawer $c$ and water-tray $h$ are removed and the tank $b$ is charged with water of any temperature less than that at which the apparatus is required to be kept. The lamp $i$ is then lighted and placed under the chimney $k$, the weight $r^7$ is slid to the end of the rod $r^6$ nearest the fulcrum of the lever $r^2$, and the screw $r^5$ is turned until the levers $r'\ r^2$ are supported by the rod $q$ at such a height that the damper $l$ shall rest on the chimney $k$. The water-tray $h$ is then filled with slightly warm water and placed in the apparatus, and the egg-drawer $c$ is put in its place, and the whole is allowed to remain until the temperature of the apparatus has risen to about 103° Fahrenheit. The eggs are then placed in the tray $c'$ in the drawer $c$, and the said drawer is closed. If, while the apparatus is in use, it be required to raise the temperature therein, the weight $r^7$ is slid along the rod $r^6$ toward its free end a greater or less distance, according to the increase of heat required.

By my improvements the interior of the incubator is kept at a practically even temperature, the increase of heat required to boil the liquid in the hermetically-sealed case or capsule $n'$ and the decrease of heat required to condense the said liquid being only a fraction of a degree.

That part of my invention which consists in varying the position of the valve or damper by mechanism connected with and actuated by the expansion and contraction of a hermetically-sealed case or capsule containing a liquid which boils at the temperature at which the said mechanism is required to act, is applicable to the regulation of heat for purposes other than that to which I have described it as applied.

The water-vessel is filled through the hole made for insertion of the thermometer.

Having thus described my invention of improvements in apparatus for hatching eggs by artificial heat, which improvements are in part applicable to other purposes, I wish it to be understood that I do not limit myself to the precise details hereinbefore described, as they may be varied without departing from the nature of my invention; but

I claim as my said invention—

1. The combination, in an incubator, with the water-tank and heating means, of the expansible and collapsible capsule for regulating the supply of heat, the same comprising thin sheets of metal hermetically joined together and inclosing between them a piece of fabric—such as blotting-paper—saturated with a liquid which boils at the temperature desired to be maintained in the apparatus, substantially as described.

2. The combination, with the hot-air flue and damper, of the capsule consisting of thin plates hermetically closed about a piece of fabric saturated with gasoline or other liquid which boils at a temperature of about 103° Fahrenheit, and connections whereby the expansion and collapse of said capsule operate to open and close said damper, substantially as described.

CHARLES EDWARD HEARSON.

Witnesses:
 ALFRED DONNISON,
  *Not. Pub.*, 71 *Cornhill, London.*
 PERCY L. M. KEY,
  71 *Cornhill, London, Notary's Clerk.*